US012572256B2

(12) United States Patent
Lv et al.

(10) Patent No.: US 12,572,256 B2
(45) Date of Patent: Mar. 10, 2026

(54) HOSTED APPLICATION CORNER MARK PROCESSING METHOD AND APPARATUS

(71) Applicant: Beijing Zitiao Network Technology Co., Ltd., Beijing (CN)

(72) Inventors: Feng Lv, Beijing (CN); Lingwei Meng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 160 days.

(21) Appl. No.: 18/567,961

(22) PCT Filed: May 20, 2022

(86) PCT No.: PCT/CN2022/094238
§ 371 (c)(1),
(2) Date: Dec. 7, 2023

(87) PCT Pub. No.: WO2023/000803
PCT Pub. Date: Jan. 26, 2023

(65) Prior Publication Data
US 2024/0272768 A1      Aug. 15, 2024

(30) Foreign Application Priority Data

Jul. 22, 2021     (CN) .......................... 202110839975.3

(51) Int. Cl.
*G06F 3/048*          (2013.01)
*G06F 3/04817*        (2022.01)
*G06F 9/451*          (2018.01)

(52) U.S. Cl.
CPC .......... *G06F 3/04817* (2013.01); *G06F 9/451* (2018.02)

(58) Field of Classification Search
None
See application file for complete search history.

(56) References Cited

U.S. PATENT DOCUMENTS

2010/0161713 A1      6/2010  Gangadharappa et al.
2013/0145278 A1*     6/2013  Newell ................. G06F 3/0484
                                                        715/738
(Continued)

FOREIGN PATENT DOCUMENTS

CN         108628673  A      10/2018
CN         110083467  A      8/2019
(Continued)

OTHER PUBLICATIONS

International Search Report in PCT/CN2022/094238, mailed Aug. 9, 2022, 4 pages.
Office Action in CN202110839975.3, mailed Sep. 7, 2022, 9 pages.

*Primary Examiner* — Thanh T Vu
(74) *Attorney, Agent, or Firm* — Astute IP Law Group

(57) ABSTRACT

The present disclosure provides a hosted application corner mark processing method and apparatus, a storage medium, and a server. The method comprises: in response to detecting a hosted application display operation, obtaining the application information and corner mark information of a hosted application according to the hosted application display operation; and displaying the application information in a host application and displaying the corner mark information corresponding to the application information. Therefore, the display of a hosted application corner mark is realized.

19 Claims, 6 Drawing Sheets

(56)          References Cited

U.S. PATENT DOCUMENTS

2017/0046025 A1*  2/2017  Dascola ............. G06F 3/04886
2017/0285882 A1*  10/2017  Hidinger ................ G06F 9/542
2018/0011630 A1*  1/2018  Kim ...................... G06F 1/1626
2021/0103383 A1*  4/2021  O'Rourke ............. G06F 3/0488
2022/0337536 A1*  10/2022  Meersma ............. H04L 51/224

FOREIGN PATENT DOCUMENTS

CN          110113252 A     8/2019
CN          110968769 A     4/2020
CN          110990095 A     4/2020
CN          111432067 A     7/2020
CN          111857858 A     10/2020
CN          113568695 A     10/2021
WO          2016023341 A1    2/2016

* cited by examiner

100

HOSTED APPLICATION CORNER MARK PROCESSING METHOD AND APPARATUS

CROSS-REFERENCE TO RELATED APPLICATION(S)

This application is a U.S. National Stage Application of PCT Application Serial No. PCT/CN2022/094238, filed May 20, 2022, which claims priority to Chinese Patent Application No. 202110839975.3 filed in Jul. 22, 2021 and entitled "HOSTED APPLICATION CORNER MARK PROCESSING METHOD AND APPARATUS", which are incorporated herein by reference in their entireties.

FIELD

Embodiments of the present disclosure relate to the field of computer technologies, and specifically, to a hosted application corner mark processing method and apparatus, a storage medium, a terminal device, and a server.

BACKGROUND

A hosted application is an application that can be used without being downloaded or installed. This hosted application is run in an environment provided by a host application and can be run after being dynamically loaded in the host application. Since the hosted application can be used at any time without being downloaded and installed, it has been applied more and more widely.

At present, for a notification reminder of a hosted application, in related technologies, users are usually notified by an instant message, but a state of the instant message cannot be synchronized to a state within the hosted application accurately. For example, a hosted application notifies a user of a to-be-processed item via an instant message. If the user reads the instant message but does not actually enter into the hosted application to process the item, the user may forget to process the item over time or the hosted application may send instant messages repeatedly and cause unnecessary disturbance.

SUMMARY

The embodiments of the present disclosure provide a hosted application corner mark processing method and apparatus, a storage medium, a terminal device, and a server.

In a first aspect, the present disclosure provides a hosted application corner mark processing method, applied to a terminal device. The method comprises: obtaining, in response to detecting a hosted application display operation, application information and corner mark information of a hosted application according to the hosted application display operation; and displaying the application information in a host application, and displaying the corner mark information corresponding to the application information.

In a second aspect, the present disclosure provides a hosted application corner mark processing method, applied to a host application server. The method comprises: sending the corner mark data to a host application in response to receiving corner mark data sent by a hosted application via a hosted application server.

In a third aspect, the present disclosure provides a hosted application corner mark processing apparatus, applied to a terminal device. The apparatus comprises:

an information obtaining unit, configured to obtain, in response to detecting a hosted application display operation, application information and corner mark information of a hosted application according to the hosted application display operation; and an information display unit, configured to: display the application information in a host application, and display the corner mark information corresponding to the application information.

In a fourth aspect, the embodiments of the present disclosure provide a hosted application corner mark processing apparatus, applied to a host application server. The apparatus comprises:

a data pushing unit, configured to in response to receiving corner mark data sent by a hosted application via a hosted application server, send the corner mark data to a host application.

In a fifth aspect, the embodiments of the present disclosure provide a terminal device, including:

one or more processors; a storage apparatus, storing one or more programs thereon, the one or more programs, when executed by the one or more processors, causing the one or more processors to implement the method described in any implementation of the first aspect.

In a sixth aspect, the embodiments of the present disclosure provide a host application server, including:

one or more processors; a storage apparatus, store one or more programs thereon, the one or more programs, when executed by the one or more processors, causing the one or more processors to implement the method described in any implementation of the second aspect.

In a seventh aspect, the embodiments of the present disclosure provide a computer-readable storage medium, storing a computer program thereo, wherein the computer program, when executed by one or more processors, implements the method described in any implementation of the first aspect and/or the method described in any implementation of the second aspect.

In an eighth aspect, the embodiments of the present disclosure provide a hosted application corner mark processing system, including the terminal device described in any implementation of the fifth aspect and/or the host application server described in any implementation of the sixth aspect.

According to the hosted application corner mark processing method provided by the embodiments of the present disclosure, application information and corner mark information of a hosted application are obtained, in response to detecting a hosted application display operation, according to the hosted application display operation; the application information is displayed in a host application, and the corner mark information is displayed corresponding to the application information. The display of a hosted application corner mark can be achieved. When a hosted application has a to-be-processed notification, a to-be-processed reminder will be displayed through a corner mark, so that a user can intuitively learn about a to-be-processed item of the hosted application and can directly click on the hosted application to enter into the hosted application to process the item, which improves the user experience.

BRIEF DESCRIPTION OF THE DRAWINGS

By reading the detailed description of nonrestrictive embodiments made with reference to the accompanying drawings below, other features, objectives, and advantages of the present disclosure will become more apparent. The accompanying drawings are only for the purpose of illustrating specific implementations and are not considered as a limitation on the present disclosure. In the drawings.

DETAILED DESCRIPTION OF EMBODIMENTS

The present disclosure will be explained in detail below in conjunction with the accompanying drawings and embodiments. It can be understood that the specific embodiments described here are only used to explain the relevant invention, rather than limiting the relevant invention. In addition, it should be noted that for the convenience of description, only the parts related to the relevant invention are shown in the accompanying drawings.

It should be noted that the embodiments of the present disclosure and features in the embodiments may be mutually combined without conflicts. The present disclosure will be described in detail below with reference to the accompanying drawings and the embodiments.

Figure 1:
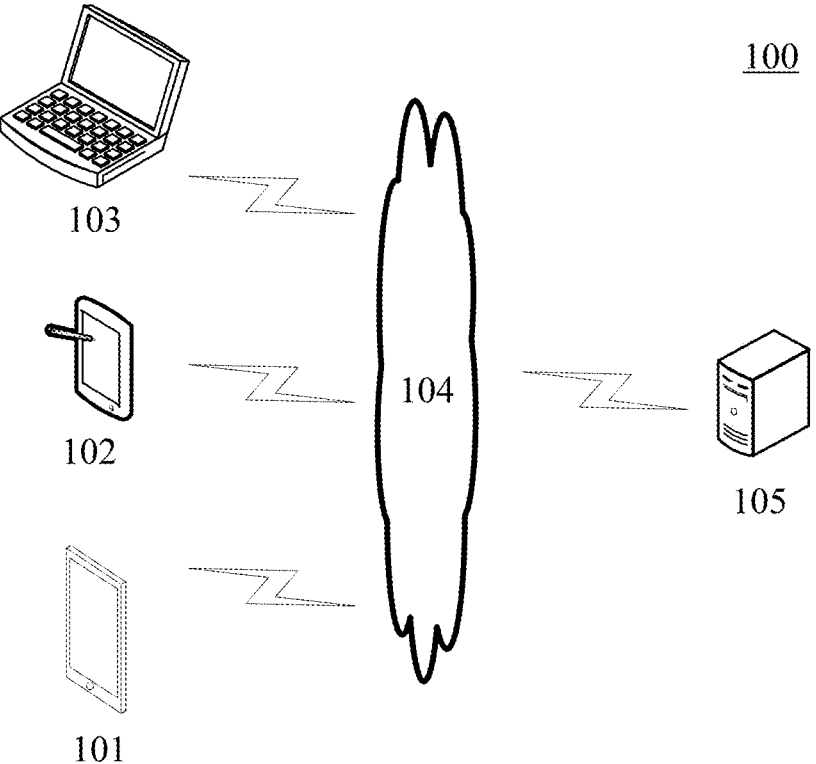
FIG. 1 is a system architecture diagram of one embodiment of a hosted application corner mark processing system according to the present disclosure.

FIG. 1 is an exemplary system architecture 100 of one embodiment applying a hosted application corner mark processing system of the present disclosure.

As shown in FIG. 1, the hosted application corner mark processing system 100 can comprise terminal devices 101, 102, 103, a network 104, and a server 105. The network 104 is a medium configured to provide communication links between the terminal devices 101, 102, 103 and the server 105. The network 104 can comprise various connection types, such as wired and wireless communication links or optical cables.

A user can use the terminal devices 101, 102, 103 to interact with the server 105 through the network 104 to receive or send messages. Various communication client applications can be installed on the terminal devices 101, 102, and 103, such as a voice recognition application, a web browser application, a shopping application, a search application, an instant messaging tool, an email client, and social platform software.

The terminal devices 101, 102, and 103 can be hardware or software. When the terminal devices 101, 102, and 103 are hardware, they can be various electronic devices with display screens and supporting sound and/or video collection, including but not limited to a smartphone, a tablet, an e-book reader, a Moving Picture Experts Group Audio Layer III (MP3) player, a Moving Picture Experts Group Audio Layer IV (MP4) player, a laptop, a desktop computer, and the like. When he terminal devices 101, 102, and 103 are software, they can be installed in the electronic devices listed above. The terminal devices can be implemented as a plurality of pieces of software or software modules (for example, to provide distributed services), or can be implemented as a single piece of software or software module. No specific limitation will be made here.

The server 105 can be a server that provides various services, for example, a backend server that supports host and hosted applications displayed on the terminal devices 101, 102, and 103. The backend server can analyze and process received data such as corner mark data, and feedback a processing result to the terminal devices.

The hosted application in the present disclosure can be an application such as a mini program that does not need to be installed on a terminal. The hosted application is run in an environment provided by the host application and can be run after being dynamically loaded in the host application. To use the hosted application, a user needs to first open the host application and then open the hosted application in the host application. In this case, the hosted application will request to establish a connection with a hosted application server. The hosted application needs to be run on a hosted application running platform integrated with the host application, such as the Software Development Kit (SDK) for mini program running. This hosted application running platform is loaded with a hosted application framework.

It can be understood that the host application can be a nativeAPP installed on the terminal device, or can be a webAPP for a browser on the terminal device. The present disclosure is not limited in this regard.

It should be noted that the server 105 can be hardware or software. When the server 105 is hardware, it can be implemented as a distributed server cluster composed of a plurality of servers or as a single server. When the server is software, it can be implemented as a plurality of pieces of software or software modules (for example, to provide distributed services), or can be implemented as a single piece of software or software module. No specific limitation will be made here.

It should be noted that the hosted application corner mark processing method applied to the terminal device provided in the present disclosure is generally executed by the terminal devices 101, 102, and 103. Correspondingly, the hosted application corner mark processing apparatus applied to the terminal device is generally configured in the terminal devices 101, 102, and 103.

It should be noted that the hosted application corner mark processing method applied to the host application server provided in the present disclosure is generally executed by the server 105, and correspondingly, the hosted application corner mark processing apparatus applied to the host application server is generally configured in the server 105.

It should be understood that the numbers of the terminal devices, the networks, and the servers in FIG. 1 are only indicative. According to an implementation need, there can be any number of terminal devices, networks, and servers.

Figure 2:
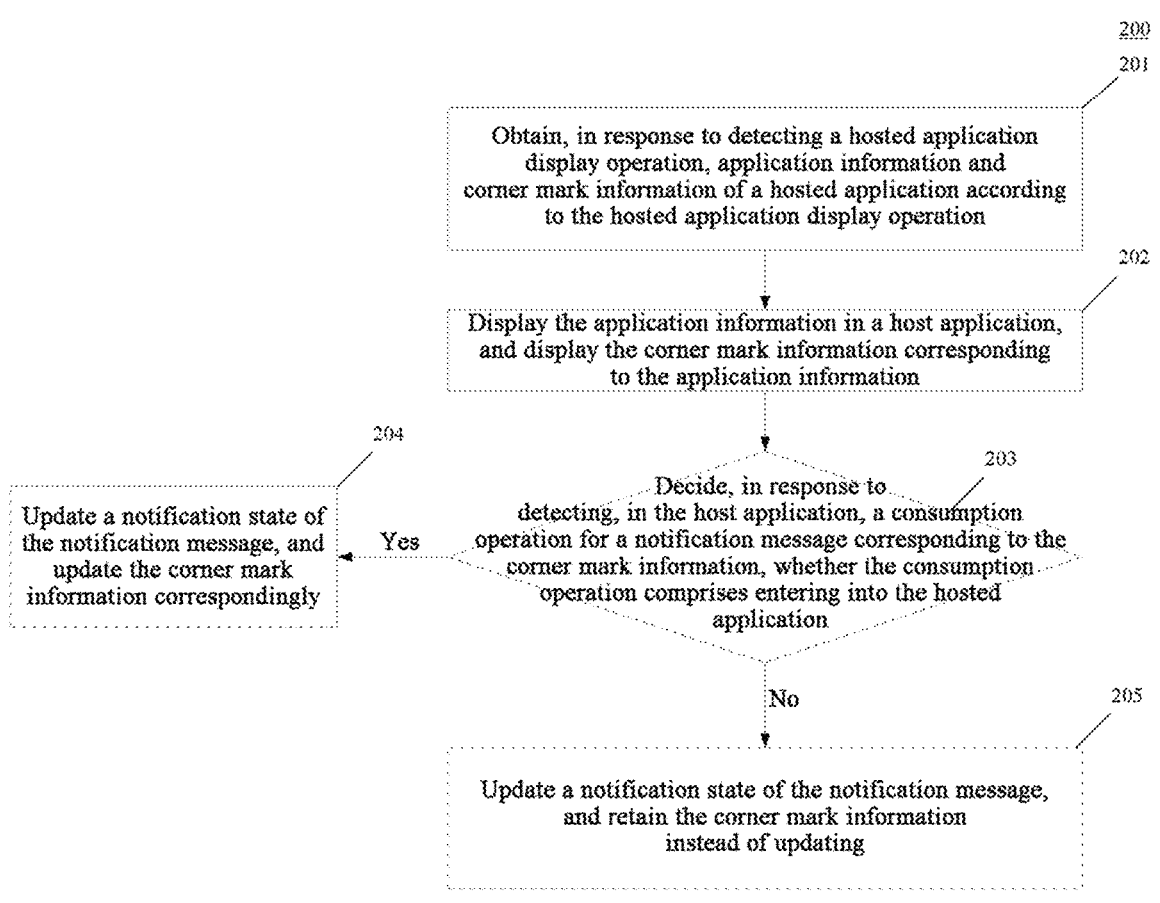
FIG. 2 is a flowchart of one embodiment of a hosted application corner mark processing method applied to a terminal device according to the present disclosure.

Continuing to refer to FIG. 2, it shows a flow 200 of one embodiment of a hosted application corner mark processing method according to the present disclosure. The hosted application corner mark processing apparatus, applied to a terminal device, can comprise the following steps:

Step 201, application information and corner mark information of a hosted application are obtained, in response to detecting a hosted application display operation, according to the hosted application display operation.

In this embodiment, the terminal device (such as the terminal devices 101, 102, and 103 shown in FIG. 1) can obtain, in a case that the hosted application display operation has been detected, the application information and the corner mark information of the hosted application according to the hosted application display operation.

The application information of the hosted application can comprise application information for display, such as a host application icon and a host application name.

The hosted application corner mark serves as a notification icon, which is used for reminding a user of a new message generated within the hosted application, such as updates or revisions of existing functions and activities within the hosted application, addition of a new function within the hosted application, and unread information. The corner mark information of the hosted application can represent a number of new messages generated within the hosted application.

The hosted application display operation can be various preset operations that can trigger hosted application display. For example, the hosted application display operation can be as follows: A user clicks on a hosted application display interface button, or swipes the screen in a specified direction (such as down and up) on a designated interface of the hosted application.

The application information and the corner mark information of the hosted application can be pre-cached in a host application or saved in a host application server. Correspondingly, application information and corner mark information of a hosted application are obtained according to the hosted application display operation, and this can comprise: obtaining application information and/or corner mark information, stored in the host application, of the hosted application or obtaining application information and/or corner mark information of the hosted application from the host application server.

Step 202, the application information is displayed in a host application, and the corner mark information is displayed corresponding to the application information.

In this embodiment, the terminal device can display the application information on a preset host application display page.

The corner mark information is displayed corresponding to the application information, which may mean that the corner mark information is displayed at a position corresponding to the application information. For example, the corner mark information is displayed at one corner of an application icon (such as a top left corner, a top right corner, a bottom left corner, and a bottom right corner). The corner mark information may be adjacent to the application information or at least partially overlap he application icon. When the number represented by the corner mark information is zero, no hosted application corner mark will be displayed.

This embodiment obtains, in response to detecting a hosted application display operation, application information and corner mark information of a hosted application according to the hosted application display operation; and displays the application information in a host application, and displays the corner mark information corresponding to the application information. The display of a hosted application corner mark can be achieved. When a hosted application has a to-be-processed notification, a to-be-processed reminder will be displayed through a corner mark, so that a to-do list in the hosted application can be accurately and instantly expressed, and a user can learn about to-be-processed items of the hosted application intuitively and can click on the hosted application directly to enter into the hosted application to process the items, which avoids notification loss or repeated reminders and improves the user experience.

Figure 4:
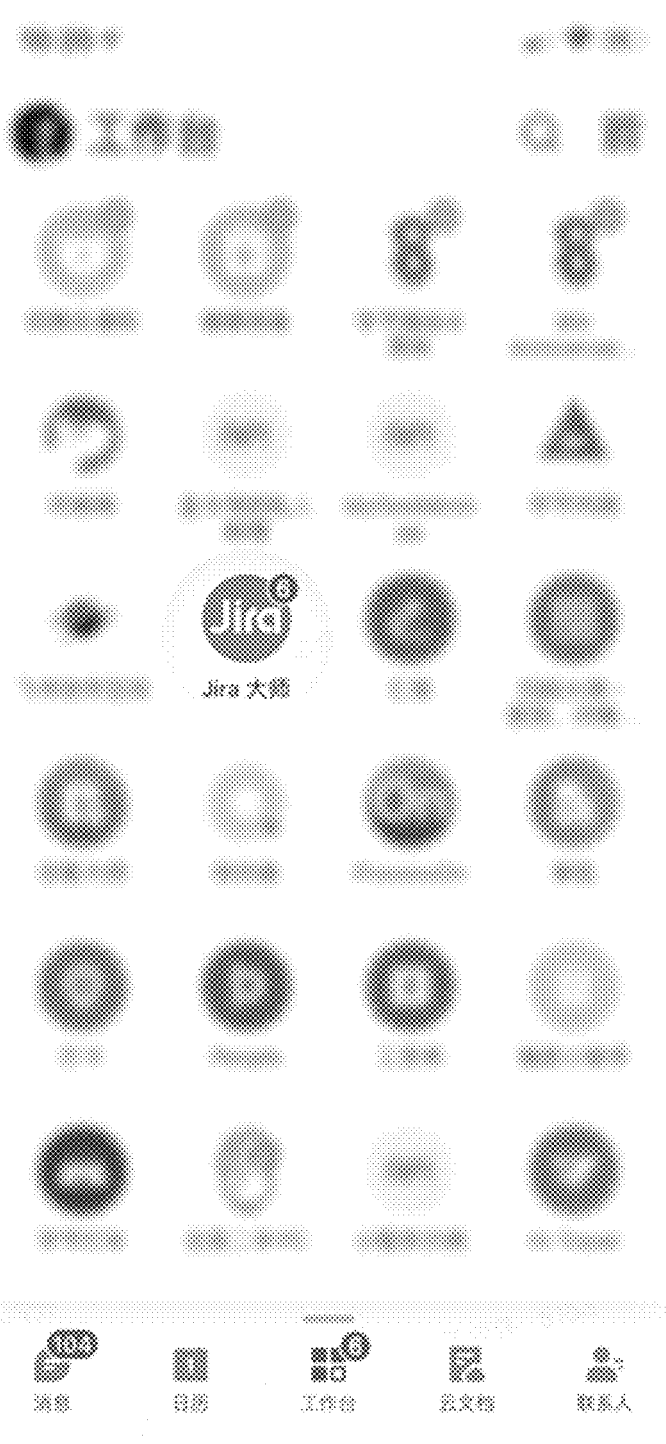
FIG. 4 is a schematic diagram of a corner mark display effect of an actual application of a hosted application corner mark processing method according to the present disclosure.

In some optional implementations, the above method further comprises:

Corner mark information of a plurality of hosted applications is obtained; total corner mark information is determined according to the corner mark information of the plurality of hosted applications, wherein the total corner mark information is used for representing a sum of numbers of corner mark information representations of the plurality of hosted applications; and the total corner mark information is displayed in the host application. In some practical applications, the effect is as shown in FIG. 4.

In some optional implementations, the above mentioned method further comprises:

Step 203, in response to detecting, in the host application, a consumption operation for a notification message corresponding to the corner mark information, deciding whether the consumption operation comprises entering into the hosted application; and executing step 204 if a decision result is yes; and executing step 205 if a decision result is no.

The notification message, corresponding to the corner mark information, in the host application may comprise an instant message used for displaying notification reminders (such as an unread message and a to-be-processed task) of the hosted application to the user.

The consumption operation refers to a processing operation for the notification message. In the present disclosure, the consumption operation may comprise an operation of entering into the hosted application. For example, after a user opens the notification message, the user further clicks on a link or button comprised in the notification message for entering into the hosted application. Or, the consumption operation may not comprise an operation of entering into the hosted application. For example, a user deletes the notification message from the hosted application directly, or does not perform the operation of entering into the hosted application after opening the notification message.

Step 204, a notification state of the notification message is updated, and the corner mark information is updated correspondingly.

The notification state of the notification message is updated, which means that the notification reminder of the notification message is canceled. For example, the notification state of the notification message is eliminated, the notification state of the notification message is reset, or the notification state of the notification message is denoted as being read. This is not a specific limitation on the update of the notification state of the notification messages, but only an example.

In some optional implementation schemes, the step 204 discussed above can specifically comprise: the notification state corresponding to the notification message is updated to the number of "none", and a number of corner mark information representations is reduced. For example, if there are two or more notification messages corresponding to the corner mark information of the same hosted application, the user may click on one of the notification messages to enter into the hosted application, and the number of the corner mark information will be reduced correspondingly while the notification state of the notification message is updated.

In some optional implementations, the step 204 discussed above may specifically comprise: the corner mark information is updated to be zero. For example, notification messages may correspond to hosted applications one by one. If the corner mark information of the same hosted application corresponds to the same notification message, when the notification state of the notification message is updated, the corner mark information is updated to be zero correspondingly, that is, the corner mark information is cleared.

The corner mark information is updated to be zero, which means that the number of corner mark information representations is updated to be zero, and no host application corner mark is displayed.

Step 205, a notification state of the notification message is updated, and the corner mark information is retained instead of being updated.

It can be understood that if the consumption operation does not comprise entering into the hosted application, the user has read the notification message but has not actually entered into the hosted application to process it. Therefore, the corner mark information is retained to remind the user to enter into the hosted application for processing.

Figure 3:
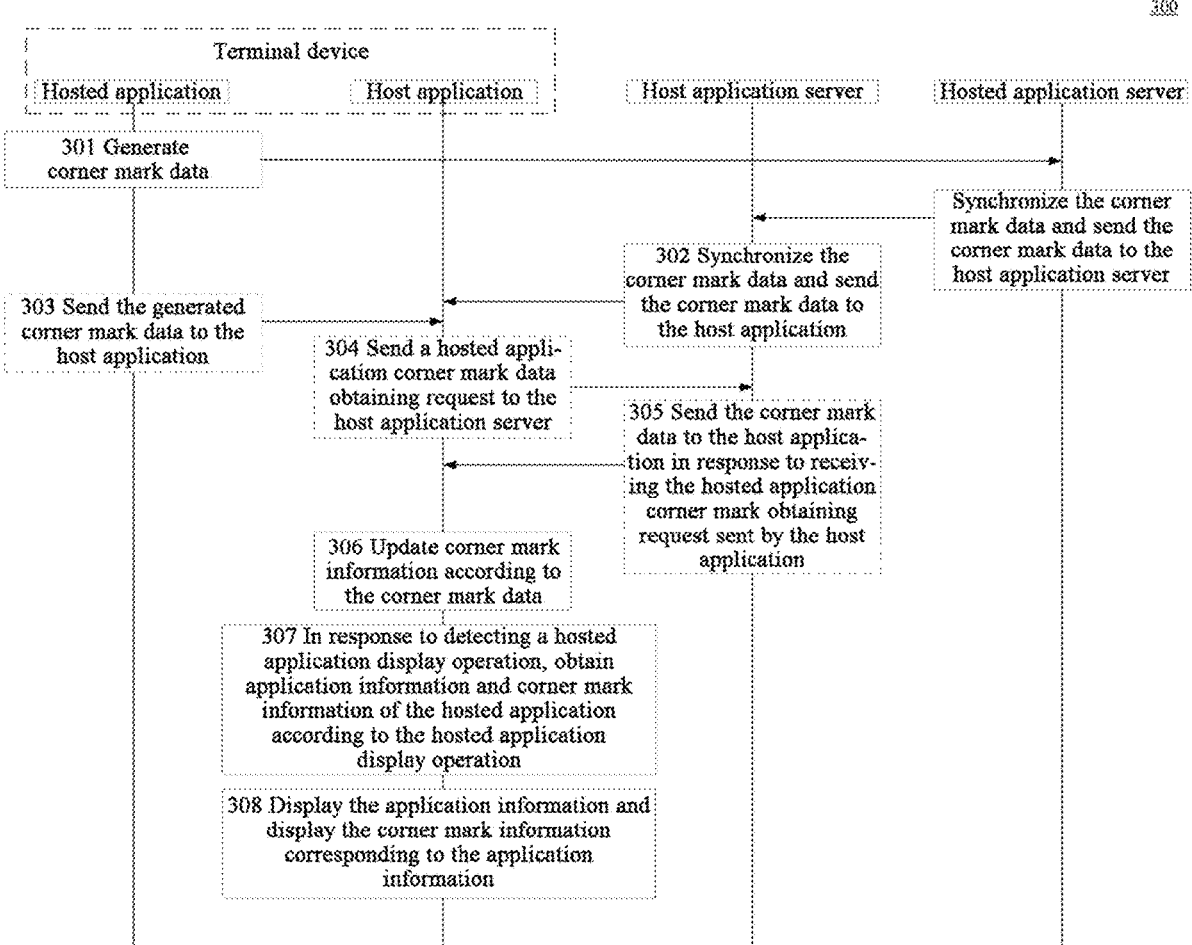
FIG. 3 is a timing diagram of one embodiment of a hosted application corner mark processing system according to the present disclosure.

Continuing to refer to FIG. 3, it shows a timing 300 of one embodiment of a hosted application corner mark processing system according to the present disclosure. The hosted application corner mark processing system in the embodiments of the present disclosure may comprise a terminal device and a host application server. The terminal device runs both a host application and a hosted application. The timing 300 comprises the following steps:

Step 301, the terminal device sends corner mark data to a host application server via a hosted application server in response to that the hosted application generates the corner mark data.

The hosted application server synchronizes the corner mark data and sends the corner mark data to the host application server in response to receiving the corner mark data sent by the terminal device.

That is, the terminal device sends the corner mark data to the host application server via the hosted application server in response to the hosted application generates the corner mark data.

It can be understood that there are at least two data connection ways between the hosted application and the host application, comprising local connection and network connection. The local connection refers to local data connection between the hosted application and the host application on the terminal device through a hosted application engine provided by the host application. The network connection is data connection established between the hosted application and the host application through the hosted application server and the host application server.

The corner mark data may comprise change data in corner mark information, such as increase or decrease in a number of corner marks and clearing of the number of corner marks. It can be understood that the hosted application generates corner mark data and it comprises data for representing a change of the corner mark information generated when the hosted application generates new and unprocessed information.

Step 302, the host application server synchronizes the corner mark data in response to receiving the corner mark data sent by the hosted application via the hosted application server, and sends the corner mark data to the host application.

Step 306, the terminal device updates, in response to receiving the corner mark data sent by the host application server, the corner mark information according to the corner mark data.

Step 307, the terminal device obtains, in response to detecting a hosted application display operation, application information and corner mark information of the hosted application according to the hosted application display operation.

Step 308, the application information is displayed, and the corner mark information is displayed corresponding to the application information.

The operations and effects of step 306 and step 307 are basically the same as those of step 201 and step 202 in the embodiment shown in FIG. 2, and will not be described in detail here.

In some optional implementations, as shown in FIG. 3, the timing 300 further comprises the following steps:

Step 303, the hosted application sends the generated corner mark data to the host application.

The hosted application can send the corner mark data to the host application directly through the local connection, so that the host application can update the corner mark information according to the corner mark data. In this way, problems such as delayed update of the corner mark information caused by a network delay or failure can be avoided.

Step 304, the host application sends a hosted application corner mark data obtaining request to the host application server.

The host application can obtain the corner mark data from the host application server after receiving the corner mark data sent by the hosted application through the local connection, and update the corner mark information, so that the local corner mark data of the terminal device is consistent with the corner mark data of the host application server.

Step 305, the host application server sends the corner mark data to the host application in response to receiving the hosted application corner mark obtaining request sent by the host application.

By obtaining the corner mark data of the host application from the host application server proactively, a failure of update of the corner mark information caused by the following fact can be avoided: the host application server fails in pushing the corner mark data to the terminal device due to a network delay or failure.

The present disclosure provides a hosted application corner mark processing method, applied to a host application server. The method comprises:

The corner mark data is sent to a host application in response to that corner mark data sent by a hosted application via a hosted application server has been received.

In some optional implementations, the above method further comprises: the corner mark data is sent to the host application in response to that a hosted application corner mark obtaining request sent by the host application has been received.

Figure 5:
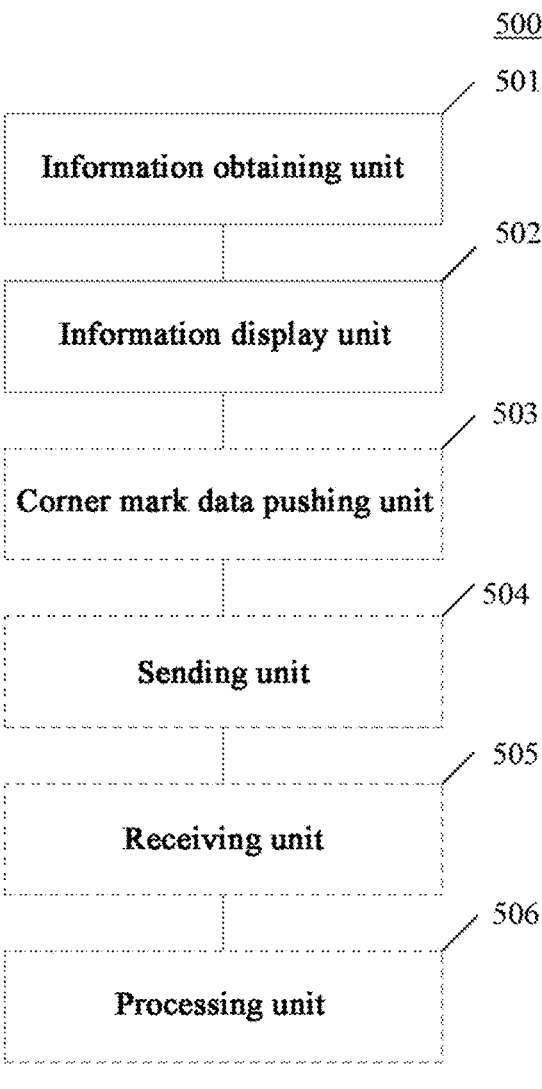
FIG. 5 is a schematic structural diagram of one embodiment of a hosted application corner mark processing apparatus applied to a terminal device according to the present disclosure.

Further referring to FIG. 5, as implementation of the method shown in the above respective figures, the present disclosure provides an embodiment of a hosted application corner mark processing apparatus. The apparatus embodiment corresponds to the method embodiment shown in FIG. 2. The apparatus can be applied to various terminal devices specifically.

As shown in FIG. 5, the hosted application corner mark processing apparatus 500 of this embodiment comprises: an information obtaining unit 501 and an information display unit 502. The information obtaining unit 501 is configured to obtain, in response to detecting a hosted application display operation, application information and corner mark information of a hosted application according to the hosted application display operation; and the information display unit 502 is configured to display the application information in a host application, and display the corner mark information corresponding to the application information.

In this embodiment, specific processing of the information obtaining unit 501 and the information display unit 502 of the hosted application corner mark processing apparatus 500 and technical effects achieved by the specific processing can respectively refer to the related explanations of step 201 and step 202 in the embodiment corresponding to FIG. 2, and will not be further elaborated here.

In some optional implementation, the hosted application corner mark processing apparatus 500 further comprises: a corner mark data pushing unit 503, a sending unit 504, a receiving unit 505, and a processing unit 506. Wherein:

the corner mark data pushing unit 503 is configured to: in response to that the hosted application generates corner mark data, send the corner mark data to a host application server via a hosted application server.

The sending unit 504 is configured to send a hosted application corner mark data obtaining request to the host application.

The receiving unit 505 is configured to receive the corner mark data sent by the host application server.

The processing unit 506 is configured to update the corner mark information according to the corner mark data.

It should be noted that the implementation details and technical effects of the respective units in the hosted application corner mark processing apparatus provided by the embodiments of the present disclosure can refer to the explanations of other embodiments in the present disclosure, and will not be further elaborated here.

Figure 6:
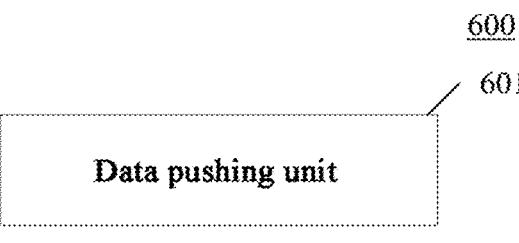
FIG. 6 is a schematic structural diagram of one embodiment of a hosted application corner mark processing apparatus applied to a server according to the present disclosure.

Further referring to FIG. 6, as implementation of the method shown in the above respective figures, the present disclosure provides an embodiment of a hosted application corner mark processing apparatus. The apparatus embodiment corresponds to the above method embodiment applied to the hosted application server. The apparatus can be specifically applied to various servers.

As shown in FIG. 6, the hosted application corner mark processing apparatus 600 of this embodiment comprises: a data pushing unit 601.

The data pushing unit 601 is configured to send the corner mark data to a host application in response to receiving corner mark data sent by a hosted application via a hosted application server.

In some optional implementations, the data pushing unit 601 is further configured to send the corner mark data to the host application in response to receiving a hosted application corner mark obtaining request sent by the host application.

It should be noted that the implementation details and technical effects of the respective units in the hosted application corner mark processing apparatus provided by the embodiments of the present disclosure can refer to the explanations of other embodiments in the present disclosure, and will not be further elaborated here.

Figure 7:
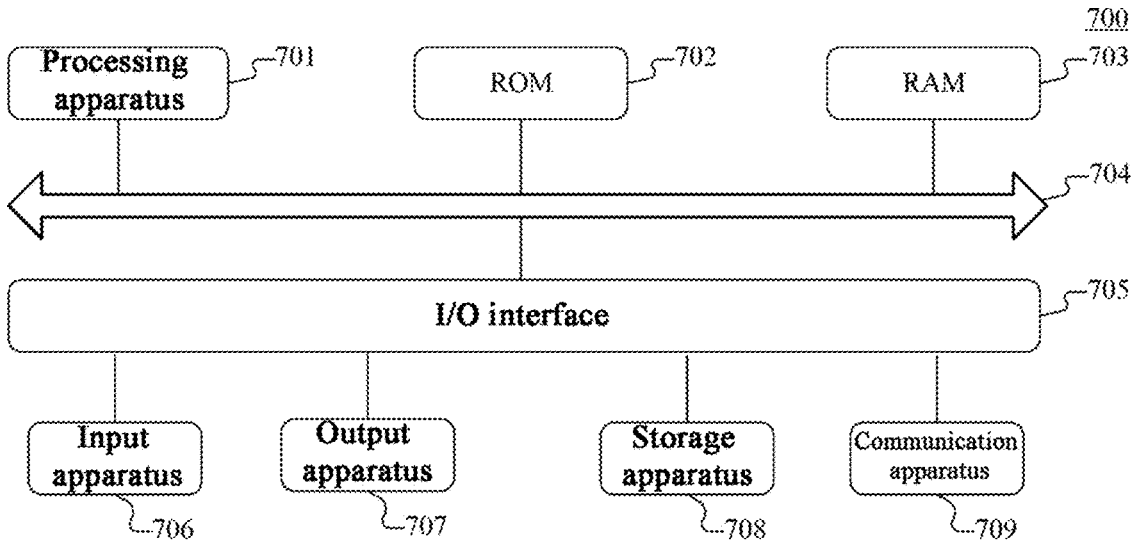
FIG. 7 is a schematic structural diagram of a computer system suitable for a terminal device or a host application server configured to implement the embodiments of the present disclosure.

Reference is now made to FIG. 7 below, which illustrates a schematic structural diagram of a computer system 700 of a terminal device or a server for being configured to implement the embodiments of the present disclosure. The computer system 700 shown in FIG. 7 is only an example and should not impose any limitations on the functionality and scope of use of the embodiments of the present disclosure.

As shown in FIG. 7, the computer system 700 may comprise a processing apparatus (such as a central processing unit and graphics processor) 701 that can perform various appropriate actions and processing according to programs stored in a Read-Only Memory (ROM) 702 or loaded from a storage apparatus 708 to a Random Access Memory (RAM) 703. Various programs and data required for operations of the computer system 700 may also be stored in the RAM 703. The processing apparatus 701, the ROM 702, and the RAM 703 are connected to each other through a bus 704. An Input/Output (I/O) interface 705 is also connected to a bus 704.

Usually, following apparatuses can be connected to the I/O interface 705: an input apparatus 706 including a touch screen, a touchpad, a keyboard, a mouse, a camera, a microphone, and the like; an output apparatus 707 including a Liquid Crystal Display (LCD), a speaker, a vibrator, and the like; a storage apparatus 708 including a magnetic tape, a hard disk drive, and the like; and a communication apparatus 709. The communication apparatus 709 can allow the computer system 700 to exchange data in a wireless or wired communication with other devices to. Although FIG. 7 shows the computer system 700 with various apparatuses, it should be understood that the computer system 700 is not required to implement or have all the apparatuses shown, and can alternatively implement or have more or fewer apparatuses.

Particularly, according to the embodiments of the present disclosure, the process described in the reference flowchart above can be implemented as a computer software program. For example, the embodiments of the present disclosure comprise a computer program product, including a computer program carried on a computer-readable medium, and the computer program comprises program codes used for performing the methods shown in the flowcharts. In such an embodiment, the computer program may be downloaded and installed from a network through the communication apparatus 709, or installed from the storage apparatus 708, or installed from the ROM 702. When the computer program is executed by the processing apparatus 701, the above-mentioned functions defined in the methods of the embodiments of the present disclosure are executed.

It should be noted that the computer-readable medium mentioned in the present disclosure can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage medium may comprise, but are not limited to: an electrical connection with one or more wires, a portable computer disk, a hard disk drive, a RAM, a ROM, an Erasable Programmable Read Only Memory (EPROM) or flash memory, an optical fiber, a Compact Disc Read-Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may comprise data signals propagated in a baseband or as part of a carrier wave, which carries computer-readable program codes. The propagated data signals can be in various forms, including but not limited to:

electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including but are not limited to: a wire, an optical cable, a Radio Frequency (RF), and the like, or any suitable combination of the above.

The computer-readable medium may be comprised in the electronic device or exist alone and is not assembled into the electronic device.

The above computer-readable medium carries one or more programs. When executed by the electronic device, the programs enable the electronic device to implement the hosted application corner mark processing method shown in the embodiment of FIG. 3 and its optional implementations, and/or, the hosted application corner mark processing method shown in the embodiment of FIG. 4 and its optional implementations.

Computer program codes for performing the operations of the present disclosure may be written in one or more programming languages or a combination thereof. The above programming languages comprise an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a LAN or a WAN, or can be connected to an external computer (for example, through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code comprises one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The units described in the embodiments of the present disclosure can be implemented through software or hardware. The name of the unit does not constitute a limitation on the unit itself. For example, the information obtaining unit can also be described as "a unit that obtains, in response to detecting a hosted application display operation, application information and corner mark information of a hosted application according to the hosted application display operation".

The above description is only for explaining the preferred embodiments of the present disclosure and technical principles used in the embodiments. Those skilled in the art should understand that the scope of disclosure referred to in the present disclosure is not limited to the technical solutions formed by specific combinations of the aforementioned technical features, but also covers other technical solutions formed by any combinations of the aforementioned technical features or their equivalent features without departing from the concept of the above disclosure, for example, a technical solution formed by replacing the above features with (but not limited to) technical features with similar functions disclosed in the present disclosure.

We claim:

1. A computer-implemented method for hosted application corner mark processing, comprising:
in response to detecting a hosted application display operation, obtaining application information and corner mark information of a hosted application according to the hosted application display operation; and
displaying the application information in a host application, and displaying the corner mark information corresponding to the application information,
in response to detecting, in the host application, a consumption operation for a notification message corresponding to the corner mark information, deciding whether the consumption operation comprises entering into the hosted application, the notification message comprising an instant message used for displaying a notification reminder of the hosted application to a user, and entering into the hosted application being that after the user opening the notification message, a link or a button comprised in the notification message for entering into the hosted application is further clicked on by the user; and
in response to the consumption operation comprising entering into the hosted application, updating a notification state of the notification message, and updating the corner mark information correspondingly.

2. The method according to claim 1, wherein the method further comprises:
in response to receiving prompt information of the hosted application, updating the corner mark information of the hosted application according to the prompt information, and updating notification information of the hosted application correspondingly; and
displaying the corner mark information corresponding to the application information of the hosted application.

3. The method according to claim 1, wherein the obtaining application information and corner mark information of a hosted application according to the hosted application display operation comprises:
obtaining the corner mark information, stored in the host application, of the hosted application.

4. The method according to claim 1, wherein the method further comprises:
in response to that the hosted application generates corner mark data, sending the corner mark data to a host application server via a hosted application server.

5. The method according to claim 4, wherein the method further comprises:
receiving the corner mark data sent by the host application server; and

updating the corner mark information according to the corner mark data.

6. The method according to claim 5, wherein the method further comprises:
sending a hosted application corner mark data obtaining request to the host application server.

7. The method according to claim 1, wherein the method further comprises:
in response to that the hosted application generates corner mark data, sending the corner mark data to the host application; and
updating the corner mark information according to the corner mark data.

8. The method according to claim 1, wherein the method further comprises:
obtaining corner mark information of a plurality of hosted applications;
determining total corner mark information according to the corner mark information of the plurality of hosted applications, the total corner mark information used for representing a sum of numbers of corner mark information representations of the plurality of hosted applications; and
displaying the total corner mark information in the host application.

9. The method according to claim 1, wherein the application information comprises at least one of: an application icon or an application name.

10. A computer-implemented method for hosted application corner mark processing, comprising:
in response to receiving corner mark data sent by a hosted application via a hosted application server, sending the corner mark data to a host application,
the corner mark data being used by the host application to update corner mark information, and the updating being performed, in response to detecting, by a terminal device, in the host application, a consumption operation for a notification message corresponding to the corner mark information, and deciding whether the consumption operation comprises entering into the hosted application and in response to the consumption operation comprising entering into the hosted application, and the updating comprising updating a notification state of the notification message and updating the corner mark information correspondingly, the notification message comprising an instant message used for displaying a notification reminder of the hosted application to a user; and entering into the hosted application being that after the user opening the notification message, a link or a button comprised in the notification message for entering into the hosted application is further clicked on by the user.

11. The method according to claim 10, wherein the method further comprises:
in response to receiving a hosted application corner mark data obtaining request sent by the host application, sending the corner mark data to the host application.

12. A terminal device, comprising:
one or more processors;
a storage apparatus, storing one or more programs thereon,
the one or more programs, when executed by the one or more processors, causing the one or more processors to:
in response to detecting a hosted application display operation, obtain application information and corner mark information of a hosted application according to the hosted application display operation; and
display the application information in a host application, and display the corner mark information corresponding to the application information,
in response to detecting, in the host application, a consumption operation for a notification message corresponding to the corner mark information, decide whether the consumption operation comprises entering into the hosted application, the notification message comprising an instant message used for displaying a notification reminder of the hosted application to a user, and entering into the hosted application being that after the user opening the notification message, a link or a button comprised in the notification message for entering into the hosted application is further clicked on by the user; and
in response to the consumption operation comprising entering into the hosted application, update a notification state of the notification message, and update the corner mark information correspondingly.

13. The terminal device according to claim 12, wherein the one or more programs, when executed by the one or more processors, further cause the one or more processors to:
in response to receiving prompt information of the hosted application, update the corner mark information of the hosted application according to the prompt information, and update notification information of the hosted application correspondingly; and
display the corner mark information corresponding to the application information of the hosted application.

14. The terminal device according to claim 12, wherein the obtaining application information and corner mark information of a hosted application according to the hosted application display operation comprises:
obtaining the corner mark information, stored in the host application, of the hosted application.

15. The terminal device according to claim 12, wherein the one or more programs, when executed by the one or more processors, further cause the one or more processors to:
in response to that the hosted application generates corner mark data, send the corner mark data to a host application server via a hosted application server.

16. The terminal device according to claim 15, wherein the one or more programs, when executed by the one or more processors, further cause the one or more processors to:
receive the corner mark data sent by the host application server; and
update the corner mark information according to the corner mark data.

17. The terminal device according to claim 16, wherein the one or more programs, when executed by the one or more processors, further cause the one or more processors to:
send a hosted application corner mark data obtaining request to the host application server.

18. The terminal device according to claim 12, wherein the one or more programs, when executed by the one or more processors, further cause the one or more processors to:
in response to that the hosted application generates corner mark data, send the corner mark data to the host application; and update the corner mark information according to the corner mark data.

19. The terminal device according to claim 12, wherein the one or more programs, when executed by the one or more processors, further cause the one or more processors to:

obtain corner mark information of a plurality of hosted applications;

determine total corner mark information according to the corner mark information of the plurality of hosted applications, the total corner mark information used for representing a sum of numbers of corner mark information representations of the plurality of hosted applications; and display the total corner mark information in the host application.

* * * * *